Sept. 27, 1932.　　　F. J. EHRLICH　　　1,879,796
BUN SPLITTER
Filed May 29, 1930　　　2 Sheets-Sheet 1
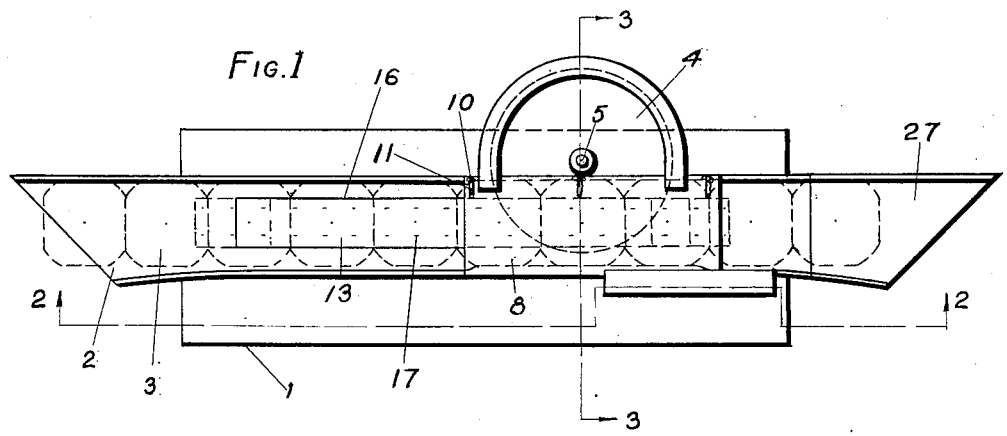
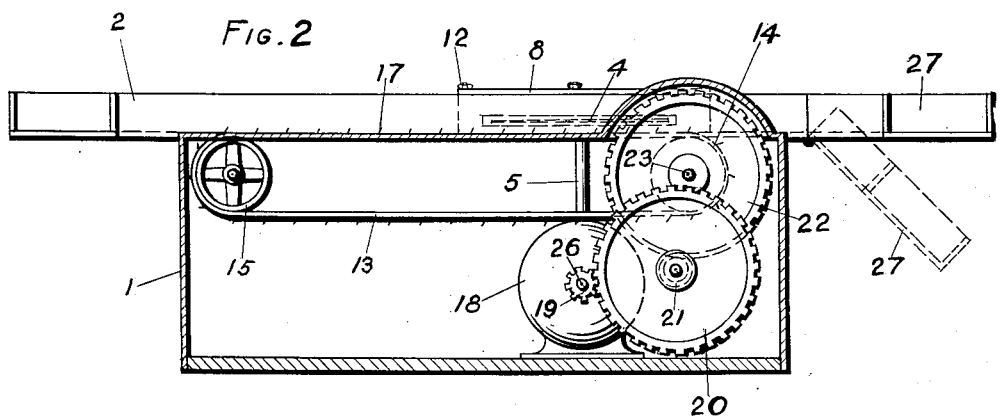
Inventor
FRANCIS J. EHRLICH
By Owen H. Spencer
Attorney Sept. 27, 1932.  F. J. EHRLICH  1,879,796
BUN SPLITTER
Filed May 29, 1930  2 Sheets-Sheet 2

Inventor
FRANCIS J. EHRLICH

By Owen H. Spencer
Attorney

Patented Sept. 27, 1932

1,879,796

UNITED STATES PATENT OFFICE

FRANCIS J. EHRLICH, OF INDIANAPOLIS, INDIANA

BUN SPLITTER

Application filed May 29, 1930. Serial No. 457,109.

This invention relates to bun splitters and the prime feature of the invention is the provision of means for forming an incision part way through a bun or the like from a lateral direction so that edibles may be inserted in the slit so formed.

A further feature of the invention is the provision of means for feeding the buns or the like to the splitting knife, either singly or in united strips.

A further feature of the invention is the provision of adjustable means for retaining the bun in proper position to be engaged by the splitting knife.

A further feature of the invention is in so constructing the operating parts of the mechanism that the splitting knife will rotate in reverse direction to the travel of the buns, whereby a clear cut incision will be made without mutilating the gun.

Other objects and advantages will be hereinafter more fully set forth and pointed out in the accompanying specification.

In the accompanying drawings which are made a part of this application,

Figure 1 is a top plan view of the machine.

Figure 2 is a sectional view thereof as seen along line 2—2, Fig. 1.

Figure 3:
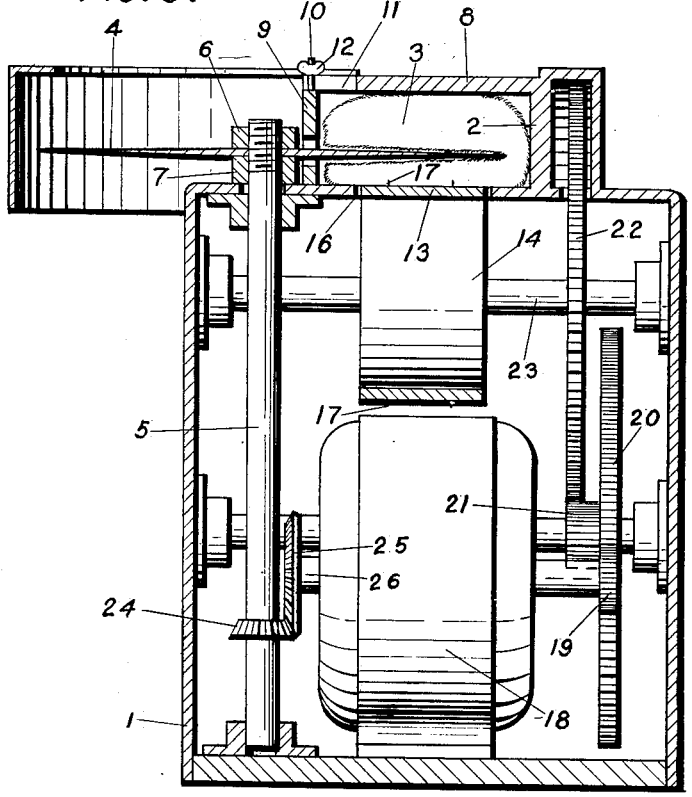
Figure 3 is a transverse sectional view through the machine as seen along line 3—3, Fig. 1.

Referring to the drawings in which similar reference numerals designate corresponding parts throughout the several views, the numeral 1 designates a frame structure, which may be constructed in any suitable manner and of any suitable material. Mounted upon the frame 1 is a chute 2, through which buns 3, or the like are to be passed when moved into the path of a knife or splitting disc 4.

The knife 4 is mounted horizontally above the top of the frame 1, with a portion thereof extending in the path of the buns 3, as they are conveyed through the chute 2, and is secured to the upper end of a shaft 5 in any suitable manner, as by means of a nut 6, a collar 7 being introduced between the knife 4 and top of the frame 1, in order to space the knife from the bottom of the chute 2 for regulating the point of incision in the bun and by providing collars of different heights, the knife may be adapted for use in connection with buns of different thicknesses.

That part of the chute 2 in registration with the knife 4 is provided with a roof portion 8, which prevents the bun or other article being slit from tilting through contact with the knife. As some buns or the like are narrower than others, one wall of the chute 2 is provided with an adjustable section 9, so that buns of different peripheral dimensions will be held adjacent the stationary wall of the chute, the adjustable section having adjusting screws 10 connected therewith, which pass upwardly through slots 11 in the roof portion 8, wing nuts 12, or the like, being provided for locking the movable section in its adjusted positions. That part of the wall of the chute 2, opposite the adjustable section 9 is thickened, as shown in Figs. 1 and 3, with the ends of the thickened portion tapering and developing into the remainder of the wall, so that when a bun reaches this point in its passage through the chute, it will be moved into close proximity to, and substantially in rubbing contact with the adjustable section 9, thus more firmly holding the bun in the path of the knife 4. By constructing the chute 2 in this manner, the buns may have more or less play while passing through the chute, except at the point of contact with the knife.

The buns 3 are fed towards the knife 4 by means of an endless belt 13 or other suitable means, said belt passing around pulleys 14 and 15, and traverses an elongated slot 16 in the bottom of the chute 2, the top face of that portion of the belt 13, passing through the slot 16 being substantially flush with the top face of the bottom of the chute.

In order to insure that the buns will be carried forwardly with the belt 13, a plurality of prongs 17, or the like, are secured at intervals to the face of the belt and these prongs are preferably slightly forwardly inclined so that the bun will not slide thereover.

The belt 13 is moved lengthwise through the slot 16 by means of a motor 18 and a series of interposed gears 19, 20, 21, and 22, the gear 22 being attached to the shaft 23 for the pulley 14 so that a pull strain will be directed against the belt to retain that portion of the belt within the slot 16, more or less taut.

The knife or disc 4 is rotated from the same motor by placing a pinion 24 on the shaft 5, which cooperates with a gear 25, on the opposite end of the rotor 26 of the motor from that occupied by the gear 19 and the pinion 24 and gear 25 are so arranged that the knife will rotate in reverse movement to the travel of the belt 13, so that a clear cut incision will be formed in the bun and without dragging through the bun, thus avoiding the possibility of mutilating or crushing the bun.

If preferred, the discharge end of the chute 2 may have a hinged section 27 so that the split buns may be discharged at different points, if desired.

It will be understood that any suitable size and shaped bun may be successfully slit ready to receive articles of food, as it is but necessary to properly adjust the parts of the machine to adapt it for different shaped and sized bun or other article being slit.

What I claim is:

1. In a slitting device for slitting buns or the like in lots of different size buns or the like, said device having a stationary frame, a chute mounted on said frame for guiding the buns, the inner surface of one side wall of said chute being curved inwardly to guide the buns more closely to the opposite side wall of said chute, an adjustable section in the said opposite side wall of said chute to vary the width of the chute to conform to the size of the buns in the different lots, a rotating knife pivoted to said frame for forming slits in the buns, said knife extending horizontally into said chute through a horizontal slit at a medial point in the height of said adjustable section at a point opposite the inwardly curved portion of the first mentioned side wall, a belt the upper strand of which forms a portion of the bottom of said chute, for moving the buns past said knife, pulleys pivoted to said frame for operating said belt, means in conjunction with said belt for engagement with said buns for causing said buns to travel with said belt, and means for causing said belt to travel lengthwise and direct tension on that portion of the belt engaging the buns.

2. In a slitting device for slitting buns or the like in lots of different size buns or the like, said device having a stationary frame, a chute mounted on said frame for guiding the buns, the inner surface of one side wall of said chute being curved inwardly to guide the buns more closely at one region to the opposite side wall of said chute, a rotating knife pivoted to said frame for forming slits in the buns, said knife extending horizontally into said chute through a horizontal slit at a medial point in the height of said opposite side wall at a point opposite the inwardly curved portion of the first mentioned side wall, a belt the upper strand of which forms a portion of the bottom of said chute, for moving the buns past said knife, pulleys pivoted to said frame for operating said belt, and an adjustable section in the said opposite side wall of said chute at said knife to vary the width of the chute to conform to the size of the buns in the different lots, for guiding said buns with respect to said knife.

3. In a slitting device for slitting buns or the like in lots of different size buns or the like, said device having a stationary frame, a chute mounted on said frame for guiding the buns, the inner surface of one side wall of said chute being curved inwardly to guide the buns more closely at one region to the opposite side wall of said chute, a rotating knife pivoted to said frame for forming slits in the buns, said knife extending horizontally into said chute through a horizontal slit at a medial point in the height of said opposite side wall at a point opposite the inwardly curved portion of the first mentioned side wall, a belt the upper strand of which forms a portion of the bottom of said chute, for moving the buns past said knife, pulleys pivoted to said frame for operating said belt, an adjustable section in the said opposite side wall of said chute at said knife to vary the width of the chute to conform to the size of the buns in the different lots, for guiding said buns with respect to said knife, means on said belt for engagement with said buns for causing said buns to travel with said belt, and means for causing said belt to travel lengthwise and direct tension on that portion of the belt engaging the buns.

4. In a slitting device for slitting buns or the like in lots of different size buns or the like, said device having a stationary frame, a chute mounted on said frame for guiding the buns, the inner surface of one side wall of said chute being curved inwardly to guide the buns more closely to the opposite side wall of said chute, a rotating knife pivoted to said frame for forming slits in the buns, said knife extending horizontally into said chute through a horizontal slit at a medial point in the height of said opposite side wall at a point opposite the inwardly curved portion of the first mentioned side wall, a belt the upper strand of which forms a portion of the bottom of said chute, for moving the buns past said knife, pulleys pivoted to said frame for operating said belt, means on said belt for engagement with said buns for causing said buns to travel with said belt, and means for causing said belt to travel and direct tension on that portion of the belt engaging the buns.

5. In a slitting device for slitting buns or the like in lots of different size buns and the like, said device having a stationary frame, a chute mounted on said frame for guiding the buns and the like, said chute having four side walls, all of which serve to contact and guide buns and the like, and prevent rotation of same in said chute, the inner surface of one side wall of said chute being curved inwardly to guide the buns more closely at one region to the opposite side wall of said chute, a rotating knife pivoted to said frame for forming slits in the buns, said knife extending horizontally into said chute through a horizontal slit at a medial point in the height of said opposite side wall at a point opposite the inwardly curved portion of the first mentioned side wall, a belt the upper strand of which forms a portion of the bottom of said chute, for moving the buns past said knife, pulleys pivoted to said frame for operating said belt, an adjustable section in the said opposite side wall of said chute at said knife to vary the width of the chute to conform to the size of the buns in the different lots, for guiding said buns with respect to said knife, means on said belt for engagement with said buns for causing said buns to travel with said belt, and means for causing said belt to travel lengthwise and direct tension on that portion of the belt engaging the buns.

In testimony whereof, I have hereunto set my hand on this the 28th day of May, 1930.

FRANCIS J. EHRLICH.